United States Patent
Tamasato

(10) Patent No.: US 10,896,269 B2
(45) Date of Patent: Jan. 19, 2021

(54) SUPPORT APPARATUS AND DESIGN SUPPORT METHOD FOR PHOTOVOLTAIC POWER GENERATION FACILITIES

(71) Applicant: TOTALMASTERS CORPORATION, Mie (JP)

(72) Inventor: Yoshinao Tamasato, Mie (JP)

(73) Assignee: TOTALMASTERS CORPORATION, Mie (JP)

(*) Notice: Subject to any disclaimer, the term of this patent is extended or adjusted under 35 U.S.C. 154(b) by 0 days.

(21) Appl. No.: 16/716,524

(22) Filed: Dec. 17, 2019

(65) Prior Publication Data
US 2020/0117839 A1 Apr. 16, 2020

Related U.S. Application Data

(63) Continuation of application No. PCT/JP2018/004556, filed on Feb. 9, 2018.

(51) Int. Cl.
*G06F 30/13* (2020.01)
*G06F 30/27* (2020.01)
(Continued)

(52) U.S. Cl.
CPC .............. *G06F 30/13* (2020.01); *G06F 30/27* (2020.01); *H02S 30/00* (2013.01); *G06F 2119/22* (2020.01)

(58) Field of Classification Search
CPC ........... G06F 30/20; G06F 30/13; G06F 30/27
See application file for complete search history.

(56) References Cited

U.S. PATENT DOCUMENTS

2006/0137736 A1 6/2006 Nishitani et al.
2012/0035887 A1\* 2/2012 Augenbraun ........... G06T 15/06
703/1
(Continued)

FOREIGN PATENT DOCUMENTS

JP 2006-185367 A 7/2006
JP 2013-99143 A 5/2013
(Continued)

OTHER PUBLICATIONS

Gilman (Gilman, P., Blair, N., Mehos, M., Christensen, C., Janzou, S., & Cameron, C. (Aug. 2008). Solar advisor model user guide for version 2.0 (No. NREL/TP-670-43704). National Renewable Energy Lab.(NREL), Golden, CO (United States). Retrieved from https://www.nrel.gov/docs/fy08osti/43704.pdf) (Year: 2008).*
(Continued)

*Primary Examiner* — Bijan Mapar
(74) *Attorney, Agent, or Firm* — Hauptman Ham, LLP

(57) ABSTRACT

A learned model is created by learning reference data that includes site data for reference photovoltaic power generation facilities, panel layout data including data on installation angles of reference photovoltaic panels, panel specifications data, sun direction data, weather data, and power generation data. A design support apparatus calculates a cumulative amount of power generation for a predetermined period by processing, for each of a plurality of pieces of provisional panel layout data on photovoltaic panels having different installation angles from each other, the relevant piece of the provisional panel layout data and input data, by the learned model, and extracts a piece of the provisional panel layout data in which the cumulative amount of power generation is maximum.

6 Claims, 10 Drawing Sheets

(51) Int. Cl.
*H02S 30/00* (2014.01)
*G06F 119/22* (2020.01)

(56) References Cited

U.S. PATENT DOCUMENTS

| | | |
|---|---|---|
| 2013/0246010 A1 | 9/2013 | Dershowitz et al. |
| 2014/0331198 A1* | 11/2014 | Bischoff .............. G06F 30/398 |
| | | 716/135 |
| 2015/0066442 A1 | 3/2015 | Pryor |
| 2016/0125557 A1 | 5/2016 | Rosner et al. |

FOREIGN PATENT DOCUMENTS

| | | |
|---|---|---|
| JP | 2017-49866 A | 3/2017 |
| JP | 2017-174175 A | 9/2017 |
| JP | 2018-7312 A | 1/2018 |
| JP | 2018-19555 A | 2/2018 |
| WO | 2011158363 A1 | 12/2011 |
| WO | 2014188427 A1 | 11/2014 |

OTHER PUBLICATIONS

Wu (Wu, Y. K., Chen, C. R., & Abdul Rahman, H. (Apr. 3, 2014). A novel hybrid model for short-term forecasting in PV power generation. International Journal of Photoenergy.) (Year: 2014).*
Extended European Search Report in EP Application No. 18904966.1, dated Oct. 6, 2020. 9 pp.

\* cited by examiner

SUPPORT APPARATUS AND DESIGN SUPPORT METHOD FOR PHOTOVOLTAIC POWER GENERATION FACILITIES

CROSS-REFERENCE TO RELATED APPLICATIONS

The present application is a continuation application of International Application No. PCT/JP2013/004556, filed on Feb. 9, 2018. The contents of this application are incorporated herein by reference in its entirety.

TECHNICAL FIELD

The present invention relates to an apparatus, a method, and a program for supporting design of the installation angle and the like of photovoltaic panels, as well as a creation apparatus for a learned model used for the foregoing.

BACKGROUND

Photovoltaic power generation is becoming widespread as a measure to counter global warming. Meanwhile, there has been a trend in recent years to curb power sales prices of photovoltaic power generation. This requires photovoltaic power generation facilities that are at a low cost and generate much electric power. The amount of power generation is affected not only by the conversion efficiency of photovoltaic panels but also by the installation angle (inclination angle and azimuth angle) and the installation position of each photovoltaic panel. Specifically, the elevation angle (altitude) and the azimuth angle of the sun vary depending on the time and the season, and the amount of solar radiation received by photovoltaic panels thus varies depending on the installation angle of each photovoltaic panel, thereby increasing or decreasing the amount of power generation. Tracking mounts have been known that are configured so that photovoltaic panels track the sun in response to changes in the elevation angle and the azimuth angle of the sun. Such tracking mounts are high in cost.

To increase the amount of power generation from fixed photovoltaic panels, design of the installation angle and the installation position is important. Conventionally, it is recommended that the azimuth angle of photovoltaic panels be due south in general. It is also recommended that the inclination angle of the photovoltaic panels be 5 to 40 degrees (an elevation angle of 85 to 50 degree). The inclination angle of each photovoltaic panel is designed taking into account not only differences in elevation angle and azimuth angle of the sun due to differences in longitude and latitude of photovoltaic power generation facilities, but also the photovoltaic panels mutual effect of shadows, the accumulation of snow or dust, and the strength of mounts against the wind, for example. More specifically, a single photovoltaic panel tends to receive more solar radiation in a case in which the inclination angle of photovoltaic panels is high (30 degrees (an elevation angle of 60 degrees), as an example) than in a case in which the inclination angle thereof is low (10 degrees (an elevation angle of 80 degree), as an example), on average. The case in which the inclination angle is high also has the advantage of snow or dust being hard to accumulate. At the same time, photovoltaic panels cast shadows over other adjacent photovoltaic panels more easily in the case in which the inclination angle of the photovoltaic panels is high than in the case in which the inclination angle thereof is low. Two adjacent photovoltaic panels thus need to be widely spaced from each other. As a result, fewer photovoltaic panels may be installed, so that the amount of power generation ends up being decreased. Additionally, photovoltaic panels are more susceptible to the wind in the case in which the inclination angle of the photovoltaic panels is high than in the case in which the inclination angle thereof is low, which sometimes requires strong mounts and may be a factor in increasing the cost.

The amount of photovoltaic power generation is greatly affected by weather conditions. For example, photovoltaic panels receive less solar radiation when it is cloudy or rainy than when it is sunny. The power generation efficiency of photovoltaic panels tends to decrease as the air temperature is higher. Because power poles are often installed for photovoltaic power generation facilities, the power poles cast shadows over the photovoltaic panels, thereby decreasing the amount of power generation. In more recent years, fewer sites have been available that are sufficiently wide and flat and suitable for photovoltaic power generation facilities. Consequently, there is a need to install photovoltaic power generation facilities in relatively small sites, sites having irregular shapes, inclined sites such as intermontane regions, or undulating sites. In such a case, buildings such as warehouses, trees, and mountains around the photovoltaic power generation facilities, for example, may cast shadows over photovoltaic panels, and become a factor in decreasing the amount of power generation. The shapes of the sites may limit the azimuth angle and the installation position of photovoltaic panels. For example, the azimuth angle of all or part of photovoltaic panels in a photovoltaic power generation facility is not due south in some cases. As described above, the amount of photovoltaic power generation depends on various natural conditions, siting conditions, and other conditions. Therefore, it is not easy to determine the optimum installation angle and installation position of photovoltaic panels.

To address the problem, a method has been known by which to calculate the amount of power generation by changing condition settings for the installation angle of photovoltaic panels and the incident amount of sunlight for each season or each time slot, and calculate annual power purchase cost on the basis of the calculated amount of power generation, and determine the installation angle of each photovoltaic panel on the basis of the calculated power purchase cost (see Patent Literature 1: Japanese Unexamined Patent Application Publication No. 2017-174175). Patent Literature 1 also discloses that the incident amount of sunlight is calculated taking into account the installation position at a point where a photovoltaic panel is installed, positional information including environmental information regarding the surrounding environment serving as a light shield, and the rate of fine weather, and that the amount of power generation is calculated. According to the method of Patent Literature 1, the installation angle of each photovoltaic panel is determined to reflect not only changes in the elevation angle and the azimuth angle of the sun but also some effect of weather conditions and the surrounding environment that casts shadows over the photovoltaic panels. The method of Patent Literature 1, however, does not take into account the effect of snow or dust accumulating, or the photovoltaic panels' mutual effect of shadows. For a method to reflect the effect of the surrounding environment that casts shadows over the photovoltaic panels, Patent Literature 1 only discloses that the effect is reflected in the rate of solar radiation, and does not present a specific method to reflect the effect of the local shadows. The effects of shadows of the surrounding buildings, trees, and earth, and weather conditions are complicated. Thus, even with the method of Patent Literature 1 used, it is conceivable that there are some cases in which there is a large discrepancy between the calculated amount of power generation and the actual amount of power generation. In other words, it is conceivable that there are some cases in which the calculated installation angle is not optimum.

A method has also been known by which to predict the amount of power generation by learning data on weather conditions and data on the amount of power generation (see Patent Literature 2: Japanese Unexamined Patent Application Publication No. 2013-099143). According to the method of Patent Literature 2, it is conceivable that a discrepancy caused by the effect of weather conditions between the calculated amount of power generation and the actual amount of power generation can be reduced.

SUMMARY

Various exemplary embodiments of the present invention provide a design support apparatus for photovoltaic power generation facilities having: an input data acquisition unit configured to acquire input data including site data on a site for a photovoltaic power generation facility that is an object to be designed, panel specifications data that includes data on power generation performance of photovoltaic panel used in the photovoltaic power generation facility, sun direction data that shows a direction of the sun on a time-series basis in a position of the site, and time-series weather data on an area corresponding to the site; and a calculation unit that includes a learned model that has been created by learning a relation between a plurality of sets of configuration data composing reference data, the reference data including site data on sites for a plurality of reference photovoltaic power generation facilities, panel layout data that includes data on installation angles of reference photovoltaic panels installed in the sites, panel specifications data that includes data on power generation performance of the reference photovoltaic panels, sun direction data that shows a direction of the sun on a time-series basis in positions of the sites, time-series weather data in areas corresponding to the sites, and time-series power generation data equivalent to actual amounts of power generated by the reference photovoltaic power generation facilities, the learned model estimating data corresponding to the power generation data from data corresponding to the reference data excluding the power generation data, the calculation unit creating a plurality of pieces of provisional panel layout data on the photovoltaic panels having different installation angles from each other, the calculation unit calculating an amount of power generation on a time-series basis by processing, for each piece of the provisional panel layout data, the relevant piece of the provisional panel layout data and the input data, by the learned model, the calculation unit calculating a cumulative amount of power generation for a predetermined period by adding up the amounts of power generation on a time-series basis, and the calculation unit extracting a piece of the provisional panel layout data in which the cumulative amount of power generation for the predetermined period is maximum.

The aforementioned design support apparatus for photovoltaic power generation facilities may be such that the panel specifications data included in the input data includes data on dimensions of the photovoltaic panel used in the photovoltaic power generation facility that is an object to be designed, at least one of the panel layout data and the panel specifications data included in the reference data includes data on dimensions of the reference photovoltaic panels, the panel layout data includes data on installation positions of the reference photovoltaic panels, and the calculation unit is configured to create a plurality of pieces of provisional panel layout data on the photovoltaic panels having different installation positions from each other.

Furthermore, the aforementioned design support apparatus for photovoltaic power generation facilities may be such that the site data included in the input data includes topographic data on the site for the photovoltaic power generation facility that is an object to be designed and light intercepting element data that shows a shape and a position of a light intercepting element that intercepts sunlight and casts a shadow over the site, the site data included in the reference data includes topographic data on the sites for the reference photovoltaic power generation facilities and light intercepting element data that shows shapes and positions of light intercepting elements that intercept sunlight and cast shadows over the sites, and the calculation unit is configured to process the input data that includes the topographic data and the light intercepting element data, by the learned model.

Still furthermore, the aforementioned design support apparatus for photovoltaic power generation facilities may further have: an image data acqustion unit configured to acquire image data on the site for the photovoltaic power generation facility that is an object to be designed; and an image data processing unit configured to create input data equivalent to at least one of the topographic data on the site for the photovoltaic power generation facility that is an object to be designed and the light intercepting element data, based on the image data, and the input data acquisition unit may be configured to acquire the data created by the image data processing unit.

The aforementioned design support apparatus for photovoltaic power generation facilities may also be such that the input data acquisition unit is configured to be able to acquire design target panel layout data as well that includes data on an installation angle of the photovoltaic panel used in the photovoltaic power generation facility that is an object to be designed, and the calculation unit is configured to, when the input data acquisition unit has acquired the design target panel layout data, calculate and output, to an output unit, a cumulative amount of power generation for a predetermined period by the photovoltaic power generation facility that is an object to be designed, the cumulative amount of power being generated corresponding to the design target panel layout data.

Further, various exemplary embodiments of the present invention also provide a design support method and a design support program for photovoltaic power generation facilities that have the same structure as the aforementioned design support apparatus. Furthermore, various exemplary embodiments of he present invention further provide a design support learned model creation apparatus for creating the aforementioned learned model.

DETAILED DESCRIPTION

Figure 1:
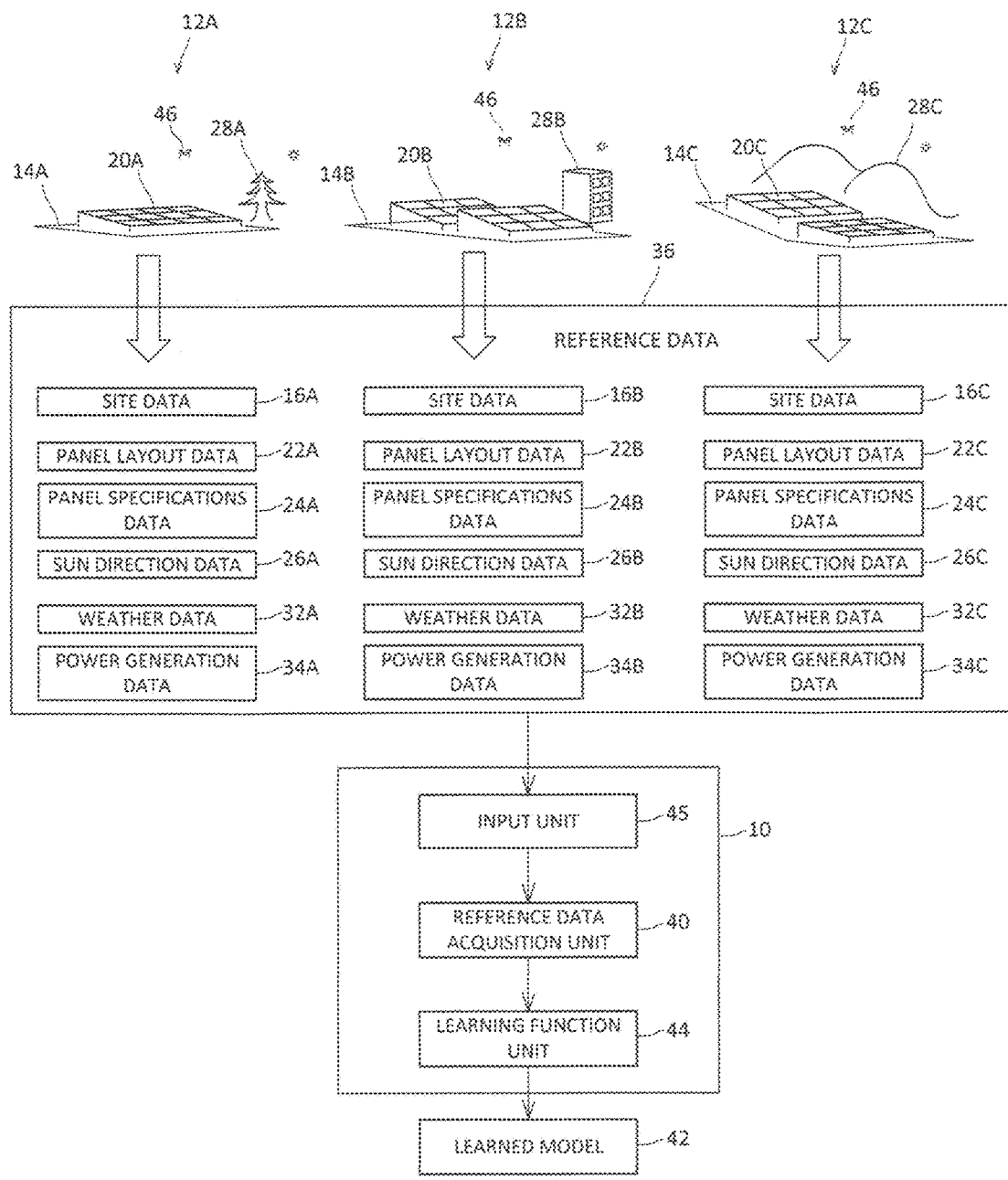
FIG. 1 is a block diagram schematically illustrating a structure of a design support learned model creation apparatus for photovoltaic power generation facilities in accordance with a first embodiment of the present invention.

FIG. 1 is a diagram illustrating a design support learned model creation apparatus 10 for photovoltaic power generation facilities in accordance with a first embodiment of the present invention. The learned model creation apparatus 10 has: a reference data acquisition unit 40 configured to acquire reference data 36 including site data 16A, 16B, 16C on sites 14A, 14B, 14C for a plurality of reference photovoltaic power generation facilities 12A, 12B, 12C, panel layout data 22A, 22B, 22C that includes data on installation angles of reference photovoltaic panels 20A, 20B, 20C installed in the sites 14A, 14B, 14C, panel specifications data 24A, 24B, 24C that includes data on the power generation performance of the reference photovoltaic panels 20A, 20B, 20C, sun direction data 26A, 26B, 26C that shows the direction of the sun on a time-series basis in the positions of the sites 14A, 14B, 14C, time-series weather data 32A, 32B, 32C in areas corresponding to the sites 14A, 14B, 14C, and time-series power generation data 34A, 34B, 34C equivalent to the actual amounts of power generated by the reference photovoltaic power generation facilities 12A, 12B, 12C; and a learning function unit 44 configured to create a learned model 42 that estimates data equivalent to the amount of power generation on a time-series basis, from the reference data 36 excluding the power generation data, by learning the relation between a plurality of sets of configuration data composing the reference data 36.

The learned model creation apparatus 10 is a computer or a computer system. The learned model creation apparatus 10 includes a learning program that causes the computer or the computer system to function as the reference data acquisition unit 40 and the learning function unit 44. The learned model creation apparatus 10 also includes an input unit 45 for inputting learning data 33. A single computer may include the input unit 45, the reference data acquisition unit 40, and the learning function unit 44. All or part of these units may be included in different computers connected through a network.

Figure 2:
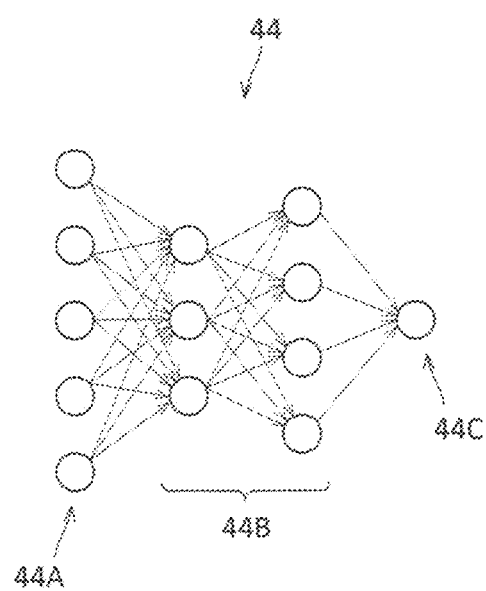
FIG. 2 is a block diagram schematically illustrating a structure of a learning function unit in the learned model creation apparatus.

FIG. 2 is a diagram illustrating the structure of the learning function unit 44 in the learned model creation apparatus 10. The learning function unit 44 is made up of a neural network, and has an input layer 44A, an intermediate layer (hidden layer) 44B, and an output layer 44C. To the input layer 44A, the reference data 36 excluding the power generation data is input. To the output layer 44C, data corresponding to the power generation data is output. The neural network is made up of nodes and synapses. Machine learning is performed in which the weights of synapses are adjusted so that the power generation data (or the data corresponding to the power generation data) output to the output layer 44C is close to the actual power generation data (or the data corresponding to the power generation data) included in the reference data 36, and the learned model 42 is created. Machine learning can be performed by software, such as TensorFlow (registered trademark), CHAINER (registered trademark), and Caffe.

The reference photovoltaic power generation facilities 12A, 12B, 12C are existing power generation facilities that are actually used or power generation facilities that were actually used in the past. Although the first embodiment provides an example in which the number of the reference photovoltaic power generation facilities is three for the sake of convenience, the reference photovoltaic power generation facilities are preferably as large as possible in number. The site data 16A, 16B, 16C includes positional data, shape data, and topographic data on the sites 14A, 14B, 14C, as well as light intercepting element data that shows the shapes and the positions of light intercepting elements 28A, 23B, 28C that intercept sunlight and cast shadows over the sites 14A, 14B, 14C. The positional data is the latitude and longitude of the site 14, for example. The shape data is data on the shapes of the boundaries of the sites 14A, 14B, 14C. The topographic data is three-dimensional data on the sites 14A, 14B, 14C and the surrounding topography thereof. The light intercepting element data is three-dimensional data on buildings, trees, undulations such as mountains, and power poles in the sites 14A, 14B, 14C and the surroundings. The topographic data and the light intercepting element data may be a part of common three-dimensional data and another part thereof. The panel layout data 22A, 22B, 22C is data on the installation angle (the azimuth angle and the inclination angle), the installation position (for example, positions in the X, Y, and Z coordinates at which predetermined reference positions in the sites 14A, 14B, 14C serve as reference points), the breadthwise and lengthwise dimensions, for example, for each piece of the reference photovoltaic panels 20A, 20B, 20C that are actually used or that were actually used in the past. The panel specifications data 24A, 24B, 24C is data on the conversion efficiency, the rated output, the breadthwise and lengthwise dimensions, for example, of the reference photovoltaic panels 20A, 20B, 20C. The reference data 36 may also include data on the conversion efficiency of a DC-AC inverter.

The topographic data, the light intercepting element data, and the panel layout data 22A, 22B, 22C are created based on image data captured from the air by a drone 46, for example. Specifically, the position of a target point on an image can be identified as follows. The drone 46 first takes continuous images that include the target point while flying. From each image, the direction of the target point with respect to the position of the drone 46 can be identified. The position of the target point can be identified by identifying the direction of the target point with respect to the position of the drone 46 for a plurality of images. The distance between the target point and the position of the drone 46 can also be obtained by laser radiation. In this case, the position of the target point can be identified from a single image. The position of the drone 46 and the direction of a camera built in the drone 46 can be identified using GNSS such as RTK. The azimuth angle, the inclination angle, and the installation position of each of the reference photovoltaic panels 20A, 20B, 20C can be identified by identifying the positions of four corners of each of the reference photovoltaic panels 20A, 20B, 20C. The breadthwise and lengthwise dimensions of each of the reference photovoltaic panels 20A, 20B, 20C can also be identified.

The weather data 32A, 32B, 32C is data on the amount of solar radiation, the air temperature, weather conditions (such as sunny, cloudy, rainy, and snowy), and snow accumulation, for example, and data provided by a meteorological agency and NEDO (registered trademark), for example, can be used for the weather data 32A, 32B, 32C. For the weather data 32A, 32B, 32C, data obtained at a meteorological observatory at which a weather close to the weather of the photovoltaic power generation facilities 12A, 12B, 12C is observed is used. For example, the data is data at obtained a meteorological observatory that is geographically close to the photovoltaic power generation facilities 12A, 12B, 12C. The power generation data 34A, 343, 34C is time-series data on the amount of power generated by each piece of the reference photovoltaic panels 20A, 20B, 20C. For example, the power generation data 34A, 34B, 34C is data for a given length of time (at intervals of 3 minutes, for example). The power generation data 34A, 3413, 34C may be time-series data on the amount of power generated by each set of the reference photovoltaic panels 20A, 20B, 20C that is connected to a common junction box, a current collector, or a DC-AC inverter.

Each piece of data included in the reference data 36 is data that has been converted to suit machine learning by the training function unit 44. For example, the power generation data 34A, 34B, 34C is each a score value showing the ratio with respect to the maximum amount, in design terms, of power generated by each piece of the reference photovoltaic panels 20A, 20B, 20C. Data is converted as follows, for example. Data cleansing is first performed. Specifically, unnecessary data is removed, noise is removed, values that are outside the scope of learning are removed. Pieces of data are then divided into elements to form a one-dimensional array. The overall arrangement is lastly adjusted to form a one-dimensional array. The elements in the one-dimensional array correspond to the elements in the input layer 44A illustrated in FIG. 2. If each piece of data included in the reference data 36 is data suitable for machine learning by the learning function unit 44 without being converted, data conversion is unnecessary. In this case, the power generation data 34A, 34B, 34C is not score values butt data on the actual amounts of power generation.

Figure 3:
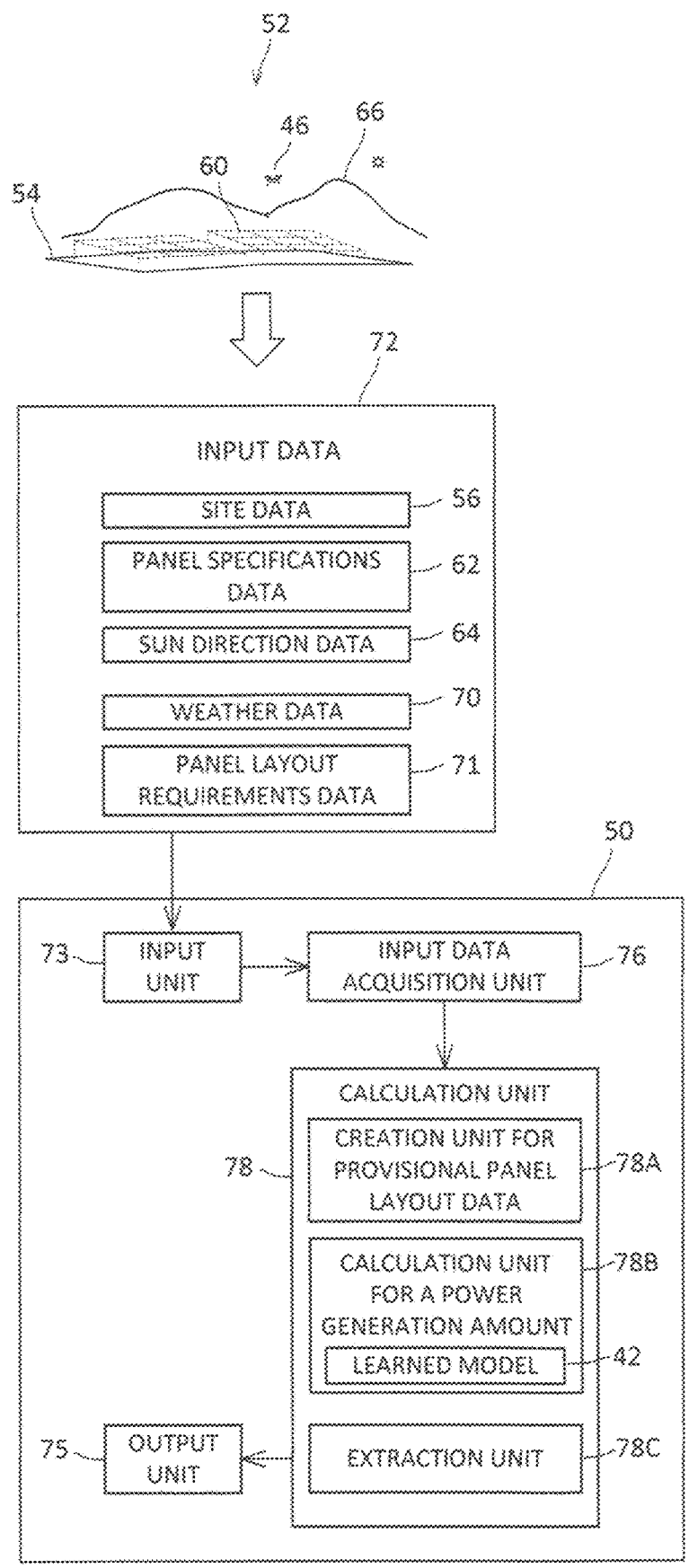
FIG. 3 is a block diagram schematically illustrating a structure of a design support apparatus for the photovoltaic power generation facilities in accordance with the first embodiment.

FIG. 3 is a diagram illustrating a design support apparatus 50 for the photovoltaic power generation facilities in accordance with the first embodiment. The design support apparatus 50 has: an input data acquisition unit 76 configured to acquire input data 72 including site data 56 on a site 54 for a photovoltaic power generation facility 52 that is an object to be designed, panel specifications data 62 that includes data on power generation performance of photovoltaic panels 60 used in the photovoltaic power generation facility 52 that is an object to be designed, sun direction data 64 that shows the direction of the sun on a time-series basis in the position of the site 54, time-series weather data 70 on an area corresponding to the site 54, and panel layout requirements data 71 that includes the allowable range of the installation angle of the photovoltaic panels 60; and a calculation unit that includes the learned model 42, that creates a plurality of pieces of provisional panel layout data on the photovoltaic panels 60 having different installation angles from each other, that calculates the amount of power generation on a time-series basis by processing, for each piece of the provisional panel layout data, the relevant piece of the provisional panel layout data and the input data by the learned model 42, that calculates (infers) a cumulative amount of power generation for a predetermined period by adding up the amounts of power generation on a time-series basis, and that extracts a piece of the provisional panel layout data in which the cumulative amount of power generation for the predetermined period is maximum.

The design support apparatus 50 for the photovoltaic power generation facilities is also a computer or a computer system. The design support apparatus 50 includes a design support program for photovoltaic power generation facilities that causes the computer or the computer system to function as the input data acquisition unit 76 and the calculation unit 78. The design support apparatus 50 also includes an input unit 73 for inputting the input data 72 and an output unit 75 for outputting a calculation result. A single computer may include the input unit 73, the input data acquisition unit 76, the calculation unit 78, and the output unit 75. All or part of these units may be included in different computers connected through a network.

The photovoltaic power generation facility 52 that is an object to be designed is, for example, a power generation facility planned to be newly constructed. The site data 56 includes positional data and shape data on the site 54, and topographic data on the site 54, as well as light intercepting element data that shows the shapes and the positions of a light intercepting elements 66 that intercept sunlight and cast a shadow over the site 54. The positional data is the latitude and longitude of the site 54, for example. The shape data is data on the shape of the boundaries of the site 54. The topographic data is three-dimensional data on the site 54 and the surrounding topography thereof. The light intercepting element data is three-dimensional data on buildings, trees, undulations such as mountains, power poles, and the like in the site 54 and its surroundings. The topographic data and the light intercepting element data included in the site data 56 are also created based on image data captured from the air by the drone 46, for example. The topographic data may be data in which the topography after development has been reflected. The light intercepting element data may include three-dimensional data on power poles and the like planned to be installed in the site 54, for example. The topographic data and the light shielding element data may be a part of common three-dimensional data and another part thereof. The panel specifications data 62 is data on the conversion efficiency, the rated output, the breadthwise and lengthwise dimensions, for example, of the photovoltaic panels 60 planned to be used in the photovoltaic power generation facility 52. The input data 72 may also include data on the conversion efficiency of a DC-AC inverter planned to be used in the photovoltaic power generation facility 52. The weather data 70 is obtained in the same manner as the weather data 32A, 32B, 32C. The allowable range of the installation angle of the photovoltaic panels 60 in the panel layout requirements data 71 is allowable ranges of the azimuth angle and the inclination angle of the photovoltaic panels 60. The allowable range of the azimuth angle is, for example, an angular range to the east side and the west side being centered at due south. The allowable range of the inclination angle is, for example, 5 to 40 degrees (an elevation angle of 85 to 50 degrees). The panel layout requirements data 71 includes the allowable range of the installation height of the photovoltaic panels 20 from the ground. The allowable range of the height is selected as appropriate in accordance with mounting equipment, such as a mount, and snow accumulation of an area in which the site 54 is located, for example. The panel layout requirements data 71 may also include a predetermined clearance between adjacent photovoltaic panels 60 or the allowable range of the clearance. The predetermined clearance between adjacent photovoltaic panels 60 or the allowable range of the clearance is selected as appropriate, taking into account a shadow a photovoltaic panel 60 casts over an adjacent photovoltaic panel 60, for example. Each piece of data included in the input data 72 is data that has been converted to suit processing by the learned model 42, like the data included in the reference data 36. If each piece of the data included in the input data 72 is data suitable for the processing by the learned model 42 without being converted, data conversion is unnecessary.

The calculation unit 78 has: a creation unit. 78A for provisional panel layout data configured to create a plurality of pieces of provisional panel layout data on the photovoltaic panels 60 having different installation angles from each other; a calculation unit 78B for a power generation amount that calculates the amount of power generation on a time-series basis by processing, for each piece of the provisional panel layout data, the relevant piece of the provisional panel layout data and the input data 72 by the learned model 42, and that calculates a cumulative amount of power generation for a predetermined period by adding up the amounts of power generation on a time-series basis; and an extraction unit 78C that extracts a piece of the provisional panel layout data in which the amount of power generation for the predetermined period is maximum. The creation unit 78A for provisional panel layout data creates provisional panel layout data in which installation angles (azimuth angles and inclination angles) and installation positions (for example, positions in the X, Y, and Z coordinates with reference to a predetermined position in the site 54) of the photovoltaic panels 60 arranged in the site 54 are identified. For example, a plurality of installation angles are selected at predetermined spacing within the allowable range of the installation angle. The installation positions in the XY direction (the horizontal direction) are identified so that as many photovoltaic panels 60 as possible can be arranged within the range of the site 54 (within the shape data), for example. The photovoltaic panels 60 may be installed with a predetermined clearance left therebetween, taking into account a shadow each photovoltaic panel 60 casts over its adjacent photovoltaic panel 60. A plurality of clearances may be selected at a predetermined spacing within an allowable range of the clearance. The installation positions in the Z direction (the up-and-down direction) are selected within the allowable range of the installation height of the photovoltaic panels 60 from the ground, for example. A plurality of installation positions in the Z direction may be selected at a predetermined spacing within the allowable range of the installation height. In this manner, a plurality of provisional panel layout data are created that have different installation angles and/or installation positions from each other.

The calculation unit 78B for a power generation amount calculates a cumulative amount of power generation for a predetermined period for each piece of provisional panel layout data. The predetermined period is, for example, one year. For example, in a case in which the installation angles of the photovoltaic panels 60 are changed regularly (every six months, every three months, every month, for example), the predetermined period may be six months (April to September, October to March, for example), three months (January to March, April to June, July to September, October to December, for example), or one month. In this case, an operator or the like may input a predetermined period for which a cumulative amount of power generation is calculated, to the input unit 73. The extraction unit 78C extracts a piece of the provisional panel layout data in which the cumulative amount of power generation for the foregoing predetermined period is maximum. In order to extract a piece of the provisional panel layout data in which the cumulative amount of power generation is maximum, many pieces of the provisional panel layout data are preferably created. A brute-force search (an exhaustive search), hill climbing, and simulated annealing, for example, can be used as a method to extract a piece of the provisional panel layout data in which the cumulative amount of power generation is maximum, from many pieces of the provisional panel layout data. Any of the methods may be selected as appropriate in accordance with the number of pieces of the provisional panel layout data and the capacity of a computing machine, for example.

Figure 4:
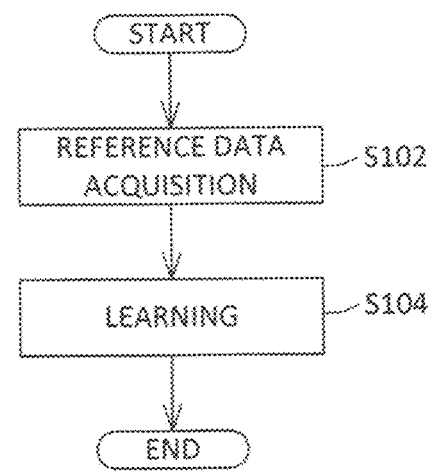
FIG. 4 is a flowchart of a method by which to create a learned model that uses the aforementioned design support learned model creation apparatus.

Next, a method is described by which to create the learned model 42 that uses the design support learned model creation apparatus 10 (see FIG. 4). First, the reference data 36 related to the reference photovoltaic power generation facilities 12A, 12B, 12C are input to the design support learned model creation apparatus 10 by the input unit 45, and the reference data acquisition unit 40 acquires the reference data 36 (S102: a reference data acquisition step). Each piece of data included in the reference data 36 is converted in advance into data suitable for machine learning by the learning function unit 44. If the reference data 36 is data suitable for machine learning by the learning function unit 44 without being converted, conversion is unnecessary. The topographic data and the light intercepting element data included in the site data 16A, 16B, 16C, as well as the panel layout data 22A, 22B, 22C are created based on image data captured from the air by the drone 46, for example, as described above. The panel layout data 22A, 22B, 22C may be data measured manually, design value data, or data based on construction records. The learning function unit 44 then performs machine learning of the reference data 36, thereby adjusting the weights of synapses to create the learned model 42 (S104: a learning step). On the basis of the learned model 42 thus obtained, the design support apparatus 50 is created.

Figure 5:
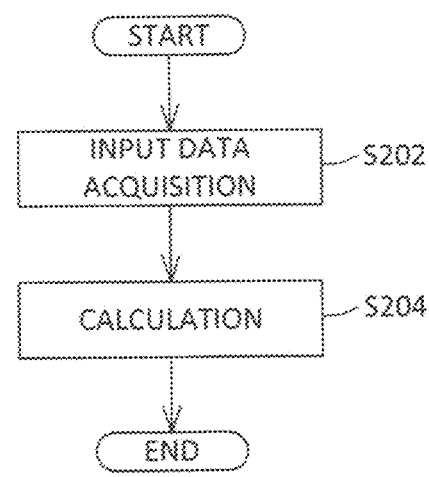
FIG. 5 is a flowchart of a design support method for photovoltaic power generation facilities that uses the aforementioned design support apparatus.

Next, a design support method for photovoltaic power generation facilities is described that uses the design support apparatus 50 (see FIG. 5). First, the input data 72 are input to the design support apparatus 50 by the input unit 73, and the input data acquisition unit 76 acquires the input data 72 (S202: an input data acquisition step). Each piece of data Included in the input data 72 is converted in advance into data suitable for processing by the learned model 42. If each piece of the data included in the input data 72 is data suitable for the processing by the learned model 42 without being converted, conversion is unnecessary. The topographic data and the light intercepting element data included in the site data 56 are also created based on image data captured from the air by the drone 46, for example. The calculation unit 78 then creates a plurality of pieces of provisional panel layout data on the photovoltaic panels 60 having different installation angles from each other, calculates the amount of power generation on a time-series basis by processing, for each piece of the provisional panel layout data, the relevant piece of the provisional panel layout data and the input data 72 on the basis of the learned model 42, and calculates (infers) a cumulative amount of power generation for a predetermined period by adding up the amounts of power generation on a time-series basis, and extracts a piece of the provisional panel layout data in which the cumulative amount of power generation for the predetermined period is maximum (S204: a calculation step). Specifically, the creation unit 78A for provisional panel layout data creates a plurality of pieces of provisional panel layout data on the photovoltaic panels 60 having different installation angles from each other (a step of creating provisional panel layout data). The creation unit 78A for provisional panel layout data also creates a plurality of pieces of provisional panel layout data on the photovoltaic panels 60 having different installation positions from each other. For example, a plurality of installation angles are selected at a predetermined spacing within the allowable range of the installation angle. The installation positions in the XY direction (the horizontal direction) are identified so that as many photovoltaic panels 60 as possible can be arranged within the range of the site 54 (within the shape data), for example. The photovoltaic panels 60 may be installed with a predetermined clearance left therebetween. A plurality of clearances may be selected at a predetermined spacing within an allowable range of the clearance. The installation positions in the Z direction (the up-and-down direction) are selected within the allowable range of the installation height of the photovoltaic panels 60 from the ground. A plurality of installation positions in the Z direction may be selected at a predetermined spacing within the allowable range of the installation height. The calculation unit 78B for a power generation amount then calculates the amount of power generation on a time-series basis by processing, for each piece of the provisional panel layout data, the relevant piece of the provisional panel layout data and the input data 72 by the learned model 42, and calculates a cumulative amount of power generation for a predetermined period by adding up the amounts of power generation on a time-series basis (a step of calculating a power generation amount). In a case in which the power generation data 34A, 34B, 34C is each a score value showing the ratio with respect to the maximum cumulative amount, in design terms, of power generated by each piece of the reference photovoltaic panels 20A, 20B, 20C, the cumulative amount of power calculated by the calculation unit 78B for a power generation amount is also a score value showing the ratio with respect to the maximum cumulative amount, in design terms, of power generated by each piece of the photovoltaic panels 60. The extraction unit 78C then extracts a piece of the provisional panel layout data in which the cumulative amount of power generation for the predetermined period is maximum (an extraction step). For a brute-force search (an exhaustive search), the step of creating provisional panel layout data, the step of calculating a power generation amount, and the extraction step are performed once in this order. For hill climbing and simulated annealing, the step of creating provisional panel layout data, the step of calculating a power generation amount, and the extraction step are repeated a plurality of times. The calculation unit 78 outputs the piece of the provisional panel layout data extracted by the extraction unit 78C, to the output unit 75.

The trained model 42 is created by learning the reference data 36 that includes data on the installation angles of the reference photovoltaic panels 20A, 20B, 20C that are existing and actually used (or that were actually used in the past). Consequently, the design support apparatus 50 can calculate a preferable installation angle of the photovoltaic panel 60 used in the photovoltaic power generation facility 52 that is an object to be designed, with high accuracy (extract a piece of the provisional panel layout data having a preferable installation angle). For example, the effect that snow or dust accumulating on the photovoltaic panels 60 has on the amount of power generation can be reflected in a result.

The panel specifications data 62 included in the input data 72 also includes data on dimensions of the photovoltaic panels 60, the panel layout data 22A, 22B, 22C and the panel specifications data 24A, 24B, 24C included in the reference data 36 also include data on the dimensions of the reference photovoltaic panels 20A, 20B, 20C, the panel layout data 22A, 22B, 22C also includes data on the installation positions of the reference photovoltaic panels 20A, 20B, 20C, and the calculation unit 78 (the creation unit 78A for a panel model) is configured to create a plurality of pieces of provisional panel layout data on the photovoltaic panels having different installation positions from each other. Consequently, the effect that a shadow each photovoltaic panel 60 casts over its adjacent photovoltaic panel 60 has on the amount of power generation can be reflected in a calculation result, with high accuracy. Furthermore, the site data 56 included in the input data 72 includes the topographic data on the site 54 for the photovoltaic power generation facility 52 that is an object to be designed and the light intercepting element data that shows the shape and the position of the light intercepting elements that intercept sunlight and cast shadows over the site, the site data 16A, 16B, 16C included in the reference data 36 includes the topographic data on the sites 14A, 14B, 14C for the reference photovoltaic power generation facilities 12A, 12B, 12C and the light intercepting element data that shows the shapes and the positions of the light intercepting elements that intercept sunlight and cast shadows over the sites, and the calculation unit 78 is configured to process the input data 72 that includes the topographic data and the light intercepting element data by the trained machine learning model 42. Consequently, the complicated effect that the local shadows of the light intercepting elements, such as the topography of undulations or mountains, for example, buildings, and trees, have on the amount of power generation can also be reflected in a calculation result, with high accuracy.

In a case in which the topographic data, the light undulations, intercepting element data, and the panel layout data 22A, 22B, 22C are created based on the image data captured from the air by the drone 46, the topographic data, the light intercepting element data, and the panel layout data with high accuracy can be obtained. This highly accurate data also contributes to highly accurate calculation of the amount of power generation. For example, in a case in which the panel layout data 22A, 22B, 22C on the reference photovoltaic panels 20A, 20B, 20C are design value data, there may be a discrepancy with the actual layout of the reference photovoltaic panels 20A, 20B, 20C. However, the effect of such a discrepancy can be reduced in the case in which the panel layout data 22A, 22B, 22C are created from the image data.

The photovoltaic power generation facility 52 that is an object to be designed may be an existing power generation facility. For example, the design support apparatus 50 is applicable also for design to change the layout of an existing photovoltaic panel so as to increase the amount of power generated by an existing power generation facility.

Figure 6:
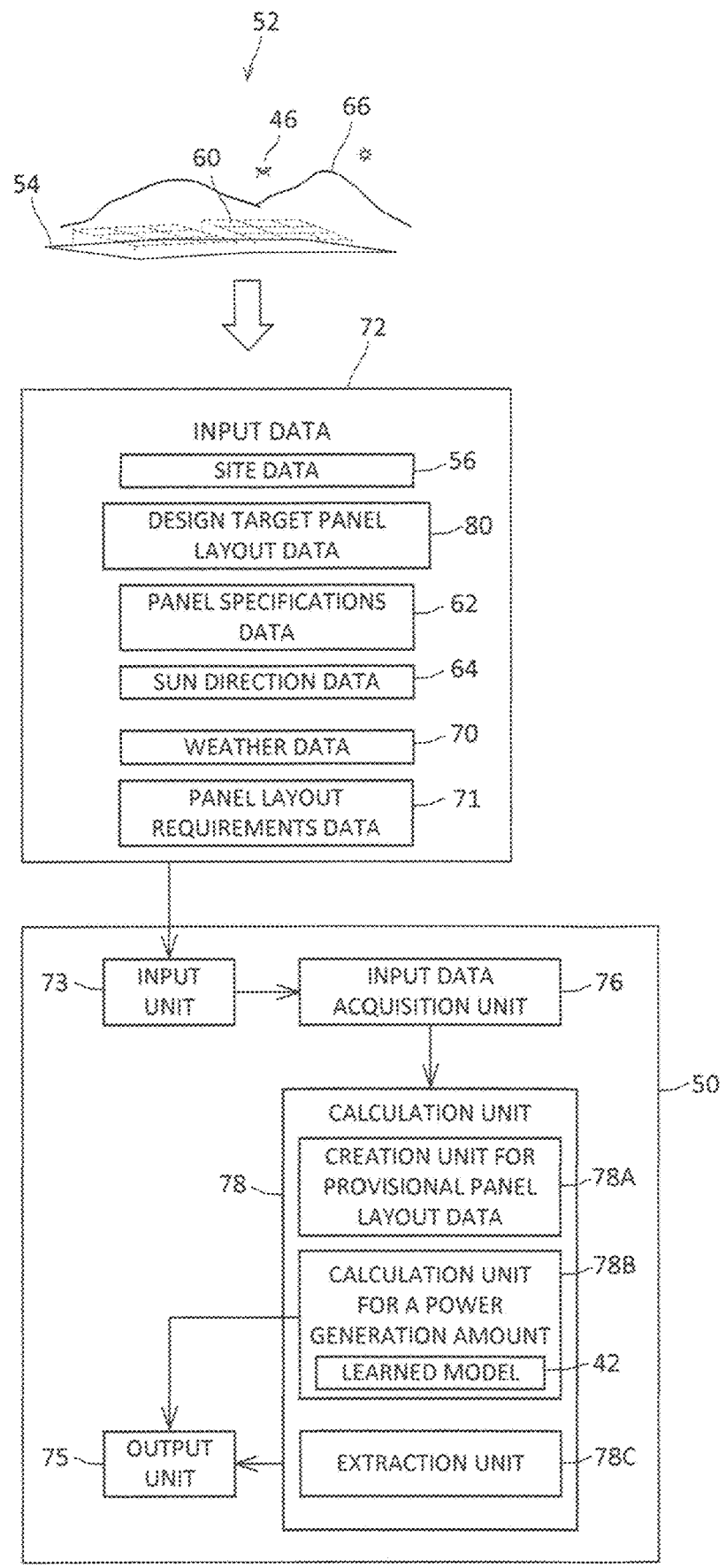
FIG. 6 is a block diagram schematically illustrating a structure of a design support apparatus for photovoltaic power generation facilities in accordance with a second embodiment of the present invention.

Next, a second embodiment of the present invention is described. In the first embodiment, a piece of the provisional panel layout data in which the cumulative amount of power generation for the predetermined period is maximum is extracted at the calculation step (S204) (the extraction step). Meanwhile, in the second embodiment, the input data acquisition unit 76 is configured to be able to acquire design target panel layout data 80 as well that includes data on installation angles and installation positions of photovoltaic panels 60 used in the photovoltaic power generation facility 52 that is an object to be designed, as illustrated in FIG. 6. The calculation unit 78 (the calculation unit 78B for a power generation amount) is configured to, when the input data acquisition unit 76 has acquired the design target panel layout data 80, calculate and output, to the output unit 75, a cumulative amount of power generated by the photovoltaic power generation facility 52 corresponding to the design target panel layout data 80. The cumulative amount of power generation to be output is, for example, a score value that is the ratio with respect to the maximum cumulative amount, in design terms, of the photovoltaic power generation facility 52. The cumulative amount of power generation itself may also be output. Other constituents are the same as those in the first embodiment, and are thus given the same reference signs as in FIGS. 1 to 3 to omit description thereof.

There are some cases in which, in a piece of the provisional panel layout data extracted in the first embodiment, the layout of the photovoltaic panels 60 may be desired to be changed. For example, in order to reduce the load of the wind, the inclination angles of the photovoltaic panels 60 may be desired to be decreased. Also, the inclination angles of the photovoltaic panels 60 may be desired to be increased so that snow or dust is hard to accumulate on the photovoltaic panels 60. According to the second embodiment, the effect that a change in the layout of the photovoltaic panels 60 has on the cumulative amount of power generation in such cases can be grasped with high accuracy. In a case in which the need is high for a function to input the installation angles of the photovoltaic panels 60 and calculate a cumulative amount of power generated by the photovoltaic power generation facility 52 for a predetermined period, and the need is low for a function to extract a piece of the provisional panel layout data in which the cumulative amount of power generation for the predetermined period is maximum, the calculation unit 78 does not need to have the creation unit 78A for provisional panel layout data and/or the extraction unit 78C.

Figure 7:
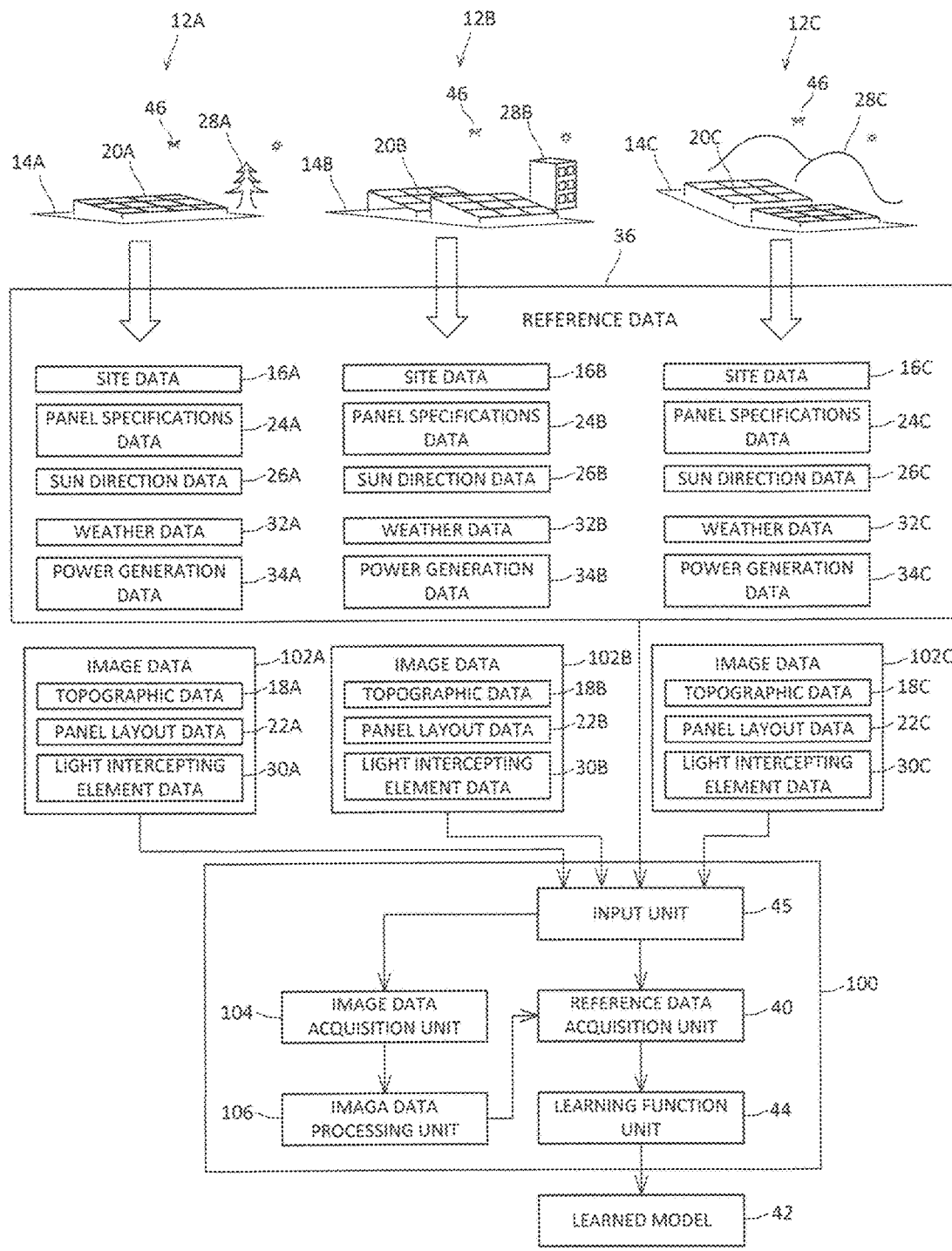
FIG. 7 is a block diagram schematically illustrating a structure of a design support learned model creation apparatus for photovoltaic power generation facilities in accordance with a third embodiment of the present invention.

Next, a third embodiment of the present invention is described. As illustrated in FIG. 7, a learned model creation apparatus 100 of the third embodiment further has: an image data acquisition unit 104 configured to acquire image data 102A, 102B, 102C on the sites 14A, 14B, 14C for the photovoltaic power generation facilities 12A, 12B, 12C and their surroundings; and an image data processing unit 106 configured to create reference data equivalent to topographic data 18A, 18B, 18C, light intercepting element data 30A, 30B, 30C, and the panel layout data 22A, 22B, 22C for the reference photovoltaic power generation facilities 12A, 12B, 12C on the basis of the image data 102A, 102B, 102C. The reference data acquisition unit 40 is configured to acquire the reference data created by the image data processing unit 106.

Figure 8:
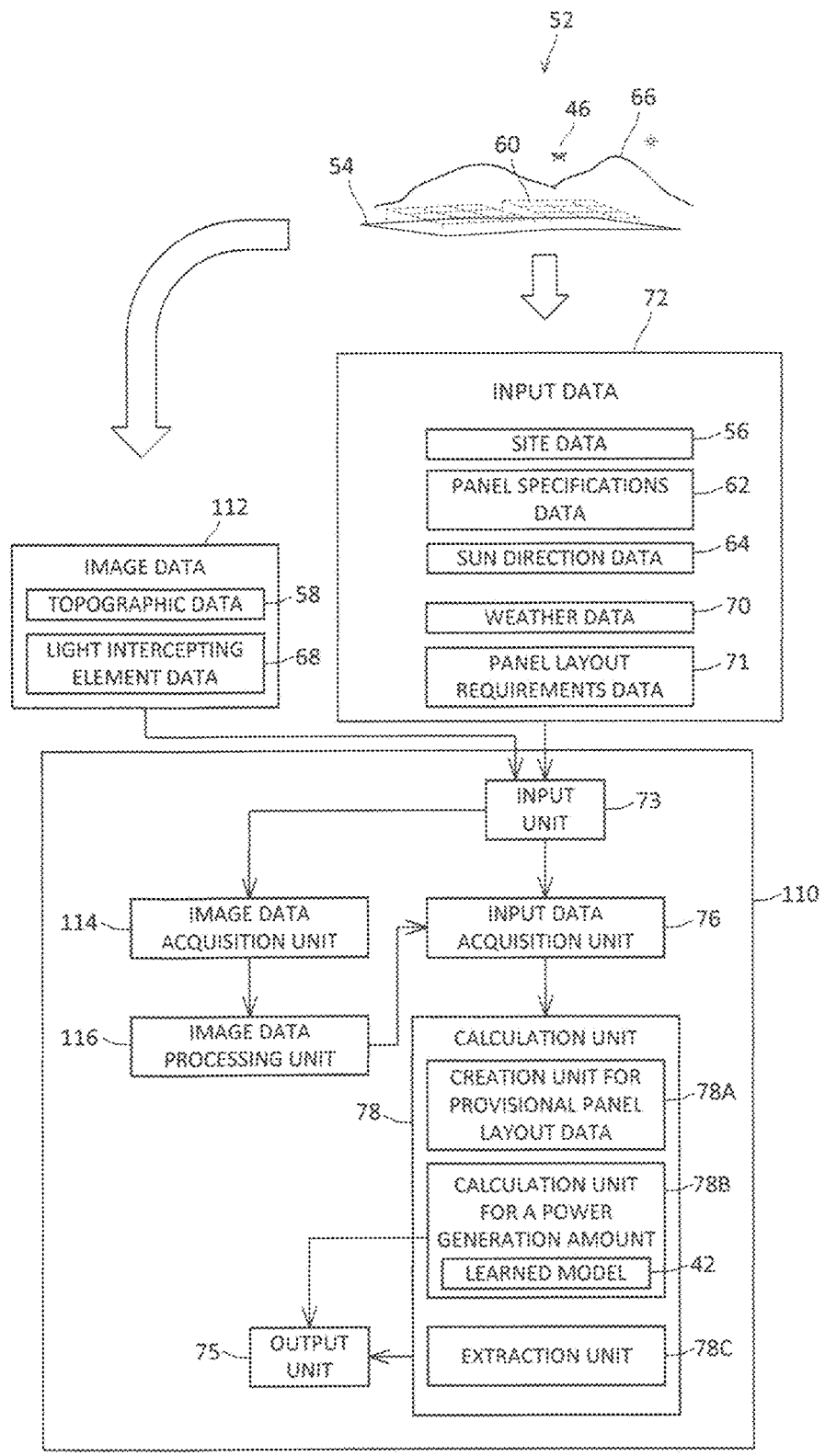
FIG. 8 is a block diagram schematically illustrating a structure of a design support apparatus for the photovoltaic power generation facilities in accordance with the third embodiment.

As illustrated in FIG. 8, a design support apparatus 110 of the third embodiment further has: an image data acquisition unit 114 configured to acquire image data 112 on the site 54 for the photovoltaic power generation facility 52 that is an object to be designed and its surroundings; and an image data processing unit 116 configured to create input data equivalent to topographic data 58 on the site 54 for the photovoltaic power generation facility 52 and light intercepting element data 68 on the basis of the image data 112. The input data acquisition unit 76 is configured to acquire the input data created by the image data processing unit 116. Other constituents are the same as those in the first embodiment or the second embodiment, and are thus given the same reference signs as in FIGS. 1 to 3 and 6 to omit description thereof.

Figure 9:
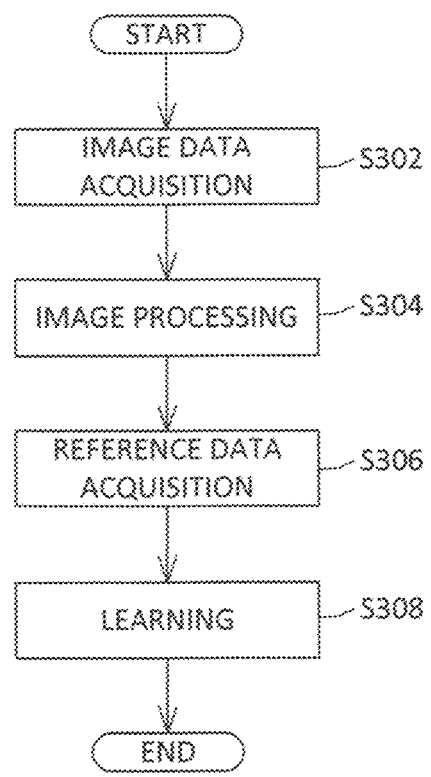
FIG. 9 is a flowchart of a method by which to create a learned model that uses the aforementioned design support learned model creation apparatus.

Next, a method is described by which to create the learned model 42 that uses the design support learned model creation apparatus 100 (see FIG. 9). The image data acquisition unit 104 first acquires the image data 102A, 102B, 102C obtained by taking images, for example, from the air by the drone 46 (S302: an image data acquisition step). The image data processing unit 106 then creates reference data equivalent to the topographic data 18A, 18B, 18C, the panel layout data 22A, 22B, 22C, and the light intercepting element data 30A, 30B, 30C for the reference photovoltaic power generation facilities 12A, 12B, 12C on the basis of the image data 102A, 102B, 102C (S304: an image processing step). The reference data acquisition unit 40 then acquires the reference data created by the image data processing unit 106 (S306: a reference data acquisition step). At the reference data acquisition step S306, the reference data acquisition unit 40 acquires the reference data 36 other than the topographic data 18A, 13B, 18C, the light intercepting element data 30A, 30B, 30C, and the panel layout data 22A, 22B, 22C in the same manner as at the reference data acquisition step S102 of the first embodiment. The learning function unit 44 then performs machine training of the reference data 36, thereby adjusting the weights of synapses to create the learned model 42 in the same manner as at the learning step S104 of the first embodiment (S308: a learning step).

Figure 10:
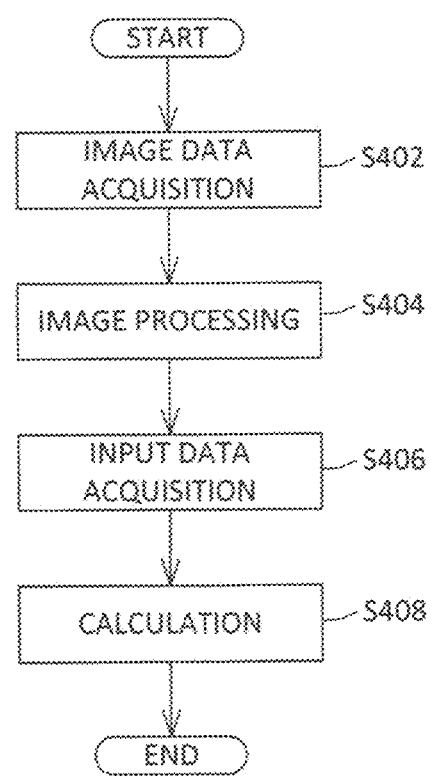
FIG. 10 is a flowchart of a design support method for photovoltaic power generation facilities that uses the aforementioned design support apparatus.

Next, a design support method for photovoltaic power generation facilities is described that uses the design support apparatus 110 (see FIG. 10). The image data acquisition unit 114 first acquires the image data 112 obtained by taking images, for example, from the air by the drone 46 (S402: an image data acquisition step). The image data processing unit 116 then creates input data equivalent to the topographic data 58 on the site 54 for the photovoltaic power generation facility 52 and light intercepting element data 68 on the basis of the image data 112 (S404: an image processing step). The input data acquisition unit 76 then acquires the input data created by the image data processing unit 116 (S406: an input data acquisition step). For the input data 72 other than the topographic data 58 and the light intercepting element 68, the input data acquisition unit 76 acquires the data at the input data acquisition step S406 in the same manner as at the input data acquisition step S202 of the first embodiment. A calculation step S408 is then performed in the same manner as the calculation step S204 of the first embodiment, and a piece of the provisional panel layout data in which the cumulative amount of power generation for the predetermined period is maximum is extracted. Alternatively, in a case in which the input data acquisition unit 76 has acquired the design target panel layout data 80 as in the second embodiment, the calculation unit 78 (the calculation unit 78B for a power generation amount) calculates and outputs, to the output unit 75, a cumulative amount of power generated by the photovoltaic power generation facility 52 corresponding to the design target panel layout data 80. According to the third embodiment, topographic data, light intercepting element data, and panel layout data with high accuracy can be easily used.

In the first to the third embodiments, the panel layout data 22A, 22B, 22C includes the data on the installation positions in addition to the data on the installation angles of the reference photovoltaic panels 20A, 20B, 20C. However, in a case in which the effect of a shadow that each photovoltaic panel 60 casts over its adjacent photovoltaic panel 60 or the effect that the local shadows of the light intercepting elements, such as the topography of undulation or mountains, for example, buildings, and trees, have on the amount of power generation can be ignored, for example, the panel layout data 22A, 22B, 22C does not need to include the data on the installation positions of the reference photovoltaic panels 20A, 20B, 20C. In such a case, nor the design target panel layout data 80 needs to include the data on the installation positions of the photovoltaic panels 60 in the second embodiment. In the first and the third embodiments, the calculation unit 78 (the creation unit 78A for provisional panel layout data) of the design support apparatus 50 may have a structure in which a plurality of pieces of provisional panel layout data on the photovoltaic panels 60 having different installation positions from each other are not created.

In the first to the third embodiments, both the panel layout data 22A, 22B, 22C and the panel specifications data 24A, 24B, 24C include the data on the breadthwise and lengthwise dimensions of the reference photovoltaic panels 20A, 20B, 20C. However, one of the panel layout data 22A, 22B, 22C and the panel specifications data 24A, 24B, 24C does not need to include the data on the breadthwise and lengthwise dimensions of the reference photovoltaic panels 20A, 20B, 20C. In a case in which the effect of a shadow that each photovoltaic panel 60 casts over its adjacent photovoltaic panel 60 can be ignored, for example, neither of the panel layout data 22A, 22B, 22C and the panel specifications data 24A, 243, 24C needs to include the data on the breadthwise and lengthwise dimensions of the reference photovoltaic panels 20A, 20B, 20C.

What is claimed is:

1. A design support apparatus for photovoltaic power generation facilities, the design support apparatus comprising a computer which comprises:

an input data acquisition unit configured to acquire input data including site data on a site for a photovoltaic power generation facility that is an object to be designed, panel specifications data that includes data on power generation performance of a photovoltaic panel used in the photovoltaic power generation facility, sun direction data that shows a direction of a sun on a time-series basis in a position of the site, and time-series weather data on an area corresponding to the site; and a calculation unit that includes a learned model that has been created by learning a relation between a plurality of sets of configuration data composing reference data, the reference data including site data on sites for a plurality of reference photovoltaic power generation facilities, panel layout data that includes data on installation angles of reference photovoltaic panels installed in the sites, panel specifications data that includes data on power generation performance of the reference photovoltaic panels, sun direction data that shows a direction of the sun on a time-series basis in positions of the sites, time-series weather data in areas corresponding to the sites, and time-series power generation data equivalent to actual amounts of power generated by the reference photovoltaic power generation facilities, the learned model estimating data corresponding to the power generation data from data corresponding to the reference data excluding the power generation data, the calculation unit creating a plurality of pieces of provisional panel layout data on the photovoltaic panels having different installation angles from each other, the calculation unit calculating an amount of power generation on a time-series basis by processing, for each piece of the provisional panel layout data, the relevant piece of the provisional panel layout data and the input data, by the learned model, the calculation unit calculating a cumulative amount of power generation for a predetermined period by adding up a plurality of the amounts of power generation on a time-series basis, and the calculation unit extracting a piece of the provisional panel layout data in which the cumulative amount of power generation for the predetermined period is maximum, wherein the reference photovoltaic power generation facilities are existing power generation facilities that are actually used or power generation facilities that were actually used in the past, the panel layout data included in the reference data includes data on inclination angles and azimuth angles of the reference photovoltaic panels, the learned model has been created by learning a relation between the time-series power generation data equivalent to actual amounts of power generated by the plurality of reference photovoltaic power generation facilities, and the data on inclination angles and azimuth angles of the reference photovoltaic panels, and the calculation unit is configured to create a plurality of pieces of provisional panel layout data on the photovoltaic panels having different inclination angles and different azimuth angles from each other.

2. The design support apparatus for photovoltaic power generation facilities according to claim 1, wherein the panel specifications data included in the input data includes data on dimensions of the photovoltaic panel used in the photovoltaic power generation facility that is an object to be designed, at least one of the panel layout data and the panel specifications data included in the reference data includes data on dimensions of the reference photovoltaic panels, the panel layout data included in the reference data includes data on installation positions of the reference photovoltaic panels, and the calculation unit is configured to create a plurality of pieces of provisional panel layout data on the photovoltaic panels having different installation positions from each other, the site data on the site for the photovoltaic power generation facility that is an object to be designed includes shape data on the site and, a plurality of the photovoltaic panels are arranged in accordance with the shape data on the site in each of the provisional panel layout data.

3. The design support apparatus for photovoltaic power generation facilities according to claim 2, wherein the site data included in the input data includes topographic data on the site for the photovoltaic power generation facility that is an object to be designed, and light intercepting element data that shows a shape and a position of a light intercepting element that intercepts sunlight and casts a shadow over the site, the site data included in the reference data includes topographic data on the sites for the reference photovoltaic power generation facilities, and light intercepting element data that shows shapes and positions of light intercepting elements that intercept sunlight and cast shadows over the sites, and the calculation unit processes the input data that includes the topographic data and the light intercepting element data, by the learned model.

4. The design support apparatus for photovoltaic power generation facilities according to claim 3, wherein
the computer further comprising:
an image data acquisition unit configured to acquire image data on the site for the photovoltaic power generation facility that is an object to be designed; and
an image data processing unit configured to create input data equivalent to at least one of the topographic data on the site for the photovoltaic power generation facility that is an object to be designed and the light intercepting element data, based on the image data, wherein
the input data acquisition unit is configured to acquire the input data created by the image data processing unit.

5. The design support apparatus for photovoltaic power generation facilities according to claim 1, wherein
the input data acquisition unit is configured to be able to acquire design target panel layout data as well that includes data on an installation angle of the photovoltaic panel used in the photovoltaic power generation facility that is an object to be designed, and
the calculation unit is configured to, when the input data acquisition unit has acquired the design target panel layout data, calculate and output, to an output unit, a cumulative amount of power generated for a predetermined period by the photovoltaic power generation facility that is an object to be designed, the cumulative amount of power being generated corresponding to the design target panel layout data.

6. A design support method for photovoltaic power generation facilities, the design support method comprising the steps of:
input data acquisition, by an input data acquisition unit, the input data acquisition including acquiring input data including site data on a site for a photovoltaic power generation facility that is an object to be designed, panel specifications data that includes data on power generation performance of a photovoltaic panel used in the photovoltaic power generation facility, sun direction data that shows a direction of a sun on a time-series basis in a position of the site, and time-series weather data on an area corresponding to the site; and calculation, by a calculation unit that includes a learned model that has been created by learning a relation between a plurality of sets of configuration data composing reference data, the reference data including site data on sites for a plurality of reference photovoltaic power generation facilities, panel layout data that includes data on installation angles of reference photovoltaic panels installed in the sites, panel specifications data that includes data on power generation performance of the reference photovoltaic panels, sun direction data that shows a direction of the sun on a time-series basis in positions of the sites, time-series weather data in areas corresponding to the sites, and time-series power generation data equivalent to actual amounts of power generated by the reference photovoltaic power generation facilities, the learned model estimating data corresponding to the power generation data from data corresponding to the reference data excluding the power generation data, the calculation including creating a plurality of pieces of provisional panel layout data on the photovoltaic panels having different installation angles from each other, calculating a value equivalent to an amount of power generation on a time-series basis by processing, for each piece of the provisional panel layout data, the relevant piece of the provisional panel layout data and the input data, by the learned model, calculating a value equivalent to a cumulative amount of power generation for a predetermined period by adding up the amounts of power generation on a time-series basis, and extracting a piece of the provisional panel layout data in which the cumulative amount of power generation for the predetermined period is maximum, wherein the reference photovoltaic power generation facilities are existing power generation facilities that are actually used or power generation facilities that were actually used in the past, the panel layout data included in the reference data includes data on inclination angles and azimuth angles of the reference photovoltaic panels, the learned model has been created by learning a relation between the time-series power generation data equivalent to actual amounts of power generated by the plurality of reference photovoltaic power generation facilities, and the data on inclination angles and azimuth angles of the reference photovoltaic panels, and a plurality of pieces of provisional panel layout data on the photovoltaic panels having different inclination angles and different azimuth angles from each other are created in the calculation step.

* * * * *